(12) United States Patent
McLaughlin et al.

(10) Patent No.: US 8,775,307 B2
(45) Date of Patent: Jul. 8, 2014

(54) SYSTEMS AND METHODS FOR ADMINISTERING EXTENDED ABSENCE INSURANCE

(75) Inventors: Kelly J. McLaughlin, Colbalt, CT (US); Jonathan Kaleb Adams, Middletown, CT (US); Christopher D. Rice, Burlington, CT (US); Carmen L. Sharp, North Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 302 days.

(21) Appl. No.: 12/840,680

(22) Filed: Jul. 21, 2010

(65) Prior Publication Data

US 2012/0022894 A1    Jan. 26, 2012

(51) Int. Cl.
*G06Q 40/00* (2012.01)
*G06Q 10/10* (2012.01)
*G06Q 40/08* (2012.01)

(52) U.S. Cl.
CPC ........... *G06Q 10/10* (2013.01); *G06Q 40/08* (2013.01)
USPC .......................................................... 705/40

(58) Field of Classification Search
None
See application file for complete search history.

(56) References Cited

U.S. PATENT DOCUMENTS

| | | | |
|---|---|---|---|
| 5,191,522 A * | 3/1993 | Bosco et al. | 705/4 |
| 5,557,515 A * | 9/1996 | Abbruzzese et al. | 705/7.15 |
| 7,184,962 B2 | 2/2007 | Kalnas et al. | |
| 2002/0072936 A1 | 6/2002 | Newman | |
| 2003/0154098 A1 * | 8/2003 | Kalnas et al. | 705/1 |
| 2004/0230460 A1 | 11/2004 | Thomas et al. | |
| 2005/0102168 A1 | 5/2005 | Thomas et al. | |
| 2006/0031104 A1 * | 2/2006 | Gianantoni | 705/4 |
| 2006/0074800 A1 | 4/2006 | Mitchell | |
| 2007/0021985 A1 | 1/2007 | Reynolds et al. | |
| 2007/0282641 A1 | 12/2007 | Thomas et al. | |
| 2007/0282642 A1 | 12/2007 | Thomas et al. | |
| 2008/0015964 A1 * | 1/2008 | Shuster | 705/36 R |
| 2008/0162195 A1 | 7/2008 | Thomas et al. | |
| 2008/0208640 A1 | 8/2008 | Thomas et al. | |
| 2008/0306779 A1 | 12/2008 | Thomas et al. | |
| 2009/0144094 A1 * | 6/2009 | Morey et al. | 705/4 |
| 2010/0100561 A1 * | 4/2010 | Cooper et al. | 707/769 |

OTHER PUBLICATIONS

Lawrence Kren, "How playing it safe pays", Mar. 2003, All Business, retrieved Apr. 22, 2010, download from Internet: http://www.allbusiness.com/print/1146842-1-22eeq.html, 2pgs.

* cited by examiner

*Primary Examiner* — Robert R. Niquette
*Assistant Examiner* — Chia Yi Liu
(74) *Attorney, Agent, or Firm* — Howard IP Law Group, PC

(57) ABSTRACT

A computer receives rating information relating to proposed issuance of an insurance policy endorsement. The rating information relates to a proposed insured that employs a number of employees. The computer processes the rating information to generate a premium amount to be charged for the insurance policy endorsement. The endorsement is then issued. The endorsement may provide reimbursement to the insured for losses incurred by the insured arising from absence from work by one or more of the employees.

22 Claims, 8 Drawing Sheets

SYSTEMS AND METHODS FOR ADMINISTERING EXTENDED ABSENCE INSURANCE

FIELD

The present invention relates to data processing systems operated in connection with issuance and administration of insurance contracts.

BACKGROUND

When an injury occurs in the workplace, the affected employee is entitled to receive benefits under a workers' compensation (WC) insurance policy that has been obtained by the employer. Among the benefits available under WC policies is compensation for lost wages for periods during which the employee is absent from work due to the injury. For some workers, short or long term disability coverage may be available to partially replace lost wages, in cases where the disability did not result from an injury on the job. Usually an employee does not receive salary or wages from the employer while the employee is receiving WC or disability benefits.

Workers' compensation insurance and disability coverage provide benefits to employees, but do not reimburse employers for increased costs or other losses that may accrue to the employer due to an employee's absence from work. (Typically a WC policy provides benefits only to injured employees and does not provide any benefit payments to an employer.) For example, while an employee is absent, the employer may need to pay overtime compensation to other employees who take over tasks that would otherwise have been performed by the absent employee. Also, the employer may incur expenses related to hiring of a temporary or permanent replacement for the injured employee. Under some circumstances, it may not be feasible to replace the employee for a period of time, and the absence of the employee may prevent the employer from realizing revenue that would have been obtained if the employee had not been absent. Moreover, even in cases where a temporary or permanent replacement is hired, or fellow employees work extended hours to cover for the absent employee, some revenue opportunities may be lost.

SUMMARY

An apparatus, method, computer system and computer-readable data storage medium are disclosed which include receiving rating information with respect to an employer for a proposed insurance policy endorsement to cover losses due to employee absence. The rating information is processed to generate the amount of premium payment that is applicable to the proposed endorsement. The insurance company issues the endorsement, which will reimburse the employer for at least some losses arising from absence from work by one or more employees. The endorsement may, for example, be included in a workers' compensation, property/casualty policy, group life insurance policy or group health insurance policy issued to the employer.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, an insurance company offers an endorsement to a workers' compensation policy or other type of policy to provide the policy holder with coverage against costs and/or lost revenue that may arise from the extended absence (or assignment to restricted duty) of one or more employees of the policy holder. In some embodiments, the endorsement may apply both to absences arising from WC-compensable disabilities as well as absences due to other causes, such as illness or parental leave.

Figure 1:
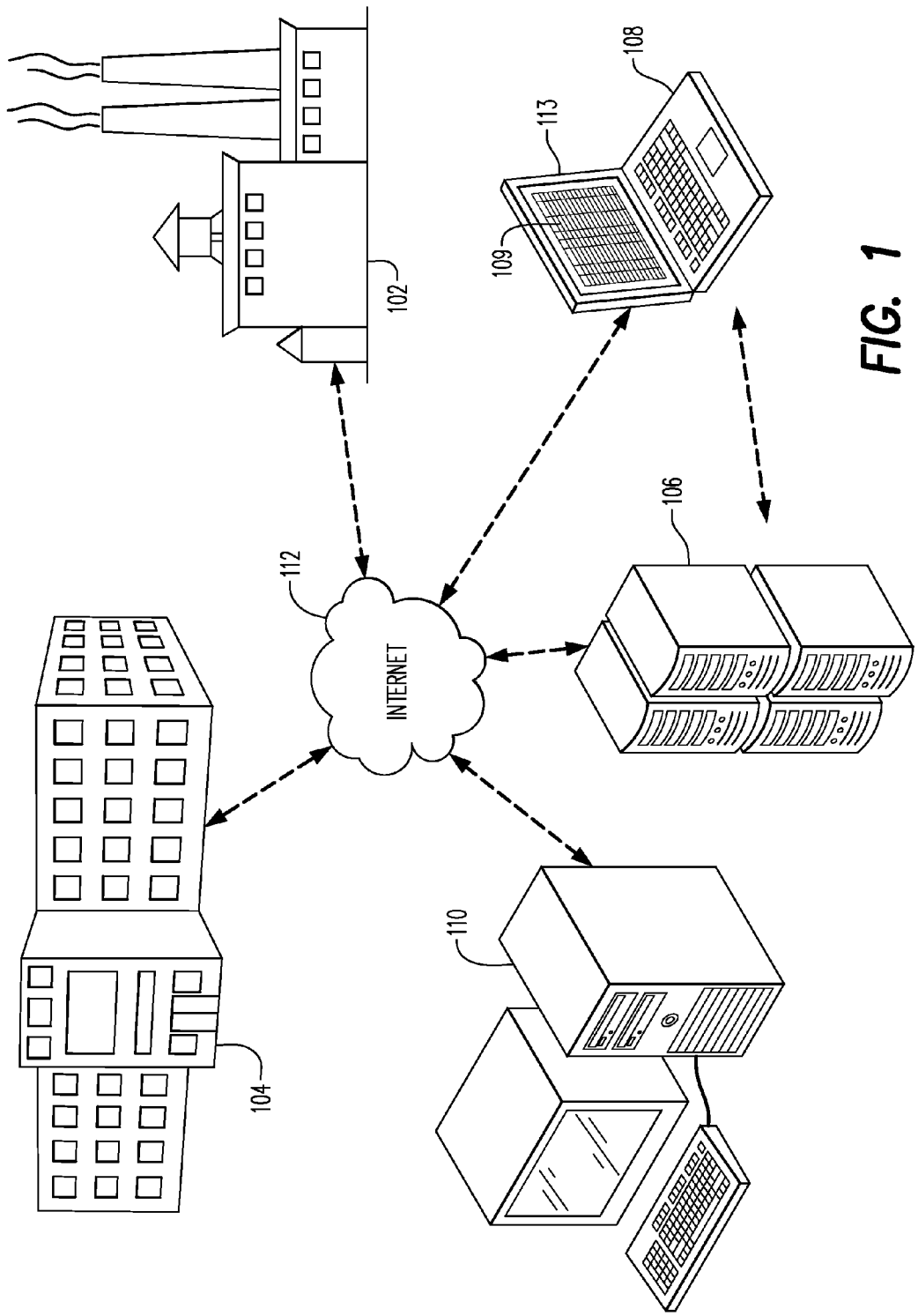
FIG. 1 schematically illustrates an environment in which principles of the present invention may be applied.

FIG. 1 schematically illustrates an environment in which principles of the present invention may be applied.

In FIG. 1, a factory 102 is schematically shown. The factory 102 employs employees (not separately shown) in a number of job categories. The factory 102 is operated by a company that maintains workers' compensation coverage for its employees and also carries fire insurance and possibly coverage for other risks to its real property (and/or carries group life, health and/or disability insurance for its employees). The company that operates the factory 102 is a potential customer for the type of employee absence coverage referred to above and provided in accordance with aspects of the present invention.

At 104, an office building is indicated. The office building 104 may, for example, house administrative employees of the company that operates the factory 102. (Alternatively, the office building 104 may be operated by another entity, such as a software company or other organization made up primarily of office workers.) Like the factory 102, the office building 104 may be the workplace of employees whose absence may tend to result in unexpected expenses or loss of revenue to their employer. Thus the employer of the workers in the office building 104 may also be a potential customer for employee absence coverage as described herein.

Reference numeral 106 indicates one or more server computers operated by an insurance company (not separately shown) that provides employee absence coverage in accordance with principles of the present invention. Reference numeral 108 indicates one of a number of personal and/or laptop computers that are operated by insurance company employees and that engage in data communications with the server(s) 106. The computers 108 display information (reference numeral 109) to the users thereof. At least some of this information may be downloaded to the computers 108 from the server computer(s) 106. In addition, reference numeral 110 indicates one of a number of other end user computers operated by insurance company employees.

The proprietor(s) of the factory 102 and/or the office building 104 may engage in data communications, at least from time to time, with one or more of the insurance company computers 106, 108, 110 (and/or with computers operated by agents for the insurance company). At least some of this communication may be via the Internet (reference numeral 112). Some of the communication may relate to data required to propose, rate and issue employee absence coverage policy endorsements, and to submit and handle claims made under such endorsements.

Figure 2:
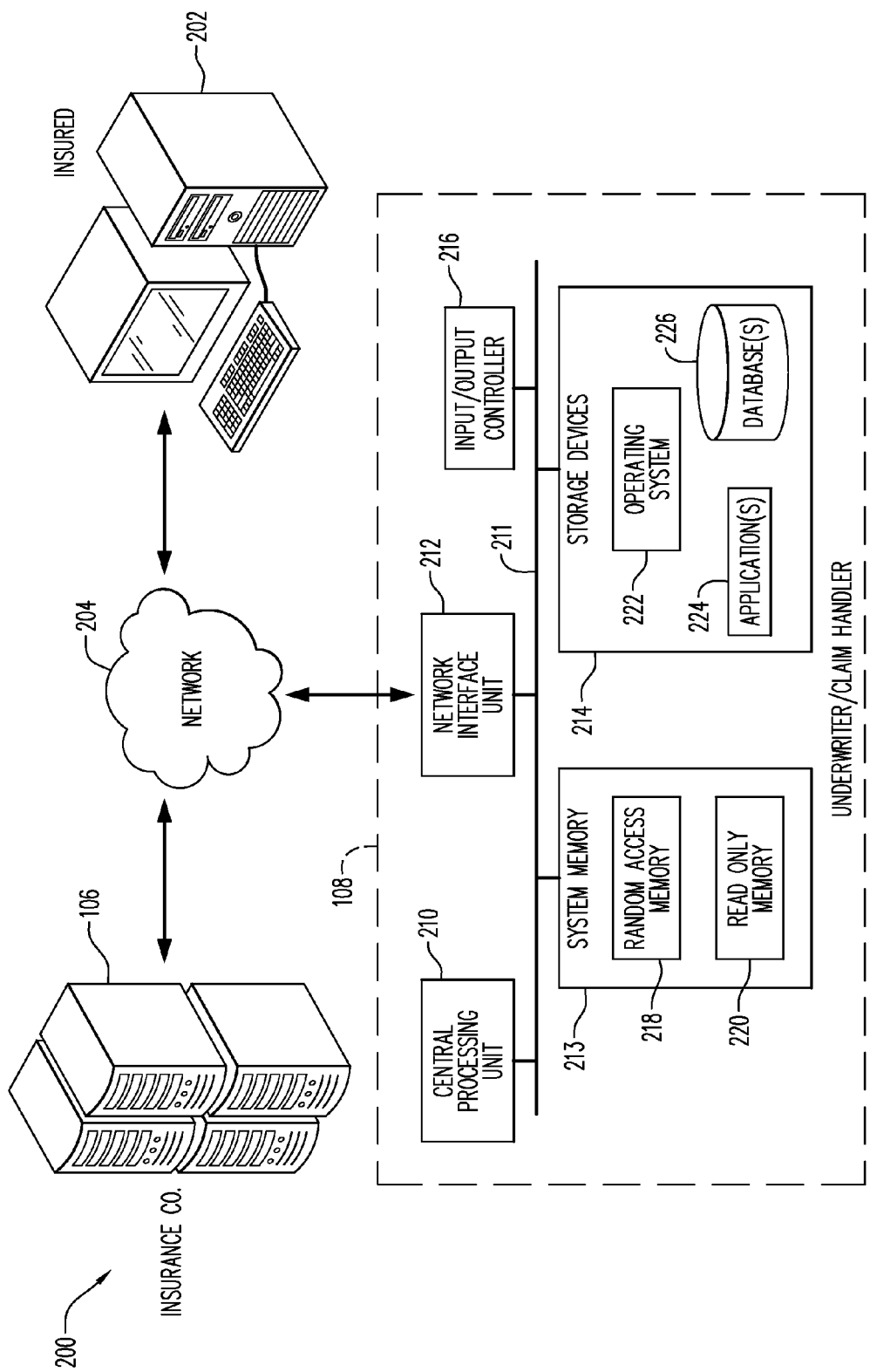
FIG. 2 is a block diagram illustration of a computer system operated in accordance with aspects of the present invention.

FIG. 2 is a block diagram illustration of a computer system 200 operated in accordance with aspects of the present invention. The computer system 200 includes a server computer 106 operated by the insurance company in connection with issuance and administration of employee absence policy endorsements. The policy employee absence coverage can also be covered by a stand alone policy. Also depicted in FIG. 2 is one of a number of personal computers 202 that may be operated by an insured or potentially insured entity for purposes of communicating with the issuance and administration server computer 106. FIG. 2 further shows a typical personal computer 108 operated by an individual employee of the insurance company for the purpose of underwriting employee absence coverage or handling claims made under such coverage.

Communications among the computers 106, 108 and 202 occurs via a data communication network 204, which may include the Internet and/or one or more other public or private data networks. In their hardware aspects, all components of the computer system 200 may be conventional. However, one or more of the insurance company computers 106, 108 may be programmed to support operation of those computers in accordance with aspects of the present invention.

As seen from FIG. 2, the insurance company personal computer 108 may have a conventional hardware architecture. Thus the insurance company personal computer 108 includes a data bus 211. The insurance company personal computer 108 also includes a computer processor (CPU) 210 which is operatively coupled to the data bus 211 and which may be constituted by one or more conventional processors. The insurance company personal computer 108 further includes a network interface unit 212, system memory 213, one or more storage devices 214, and an input/output controller 216, all of which are also operatively coupled to the data bus 211.

The network interface unit 212 may function to facilitate communication with, for example, other devices (such as the issuance and administration server computer 106). The input/output controller 216 may couple the insurance company personal computer 108 to input and output devices (not shown in FIG. 2) such as a keyboard, a keypad, a mouse or other pointing device, a microphone, knob or a switch, an infra-red (IR) port, a docking station, a touch screen, a display (e.g., a display screen such as that seen at 113 in FIG. 1), a speaker, and/or a printer.

The system memory 213 may be constituted by, for example, a suitable combination of Random Access Memory (RAM) devices 218 and Read Only Memory (ROM) devices 220.

Storage devices 214 may comprise any appropriate information storage device, including combinations of magnetic storage devices (e.g., magnetic tape and hard disk drives), optical storage devices, and/or semiconductor memory devices. At least some of these devices (and/or all or part of the system memory 213) may be considered computer-readable storage media, or may include such media.

Storage devices 214 store one or more programs (at least some of which being indicated by blocks 222, 224) for controlling CPU 200. CPU 200 performs instructions of the programs, and thereby operates in accordance with aspects of the present invention. In some embodiments, the programs may include one or more conventional operating systems, indicated by block 412 in FIG. 4. The programs may further include application programs (block 224) such as a browser, a conventional data communication program and a conventional database management program.

There may also be stored in the storage devices 214 other software, such as device drivers, etc.

Still further, the storage devices 214 may store one or more databases (block 226) for storing and managing the data relating to operation of the insurance company personal computer 108.

Figure 3:
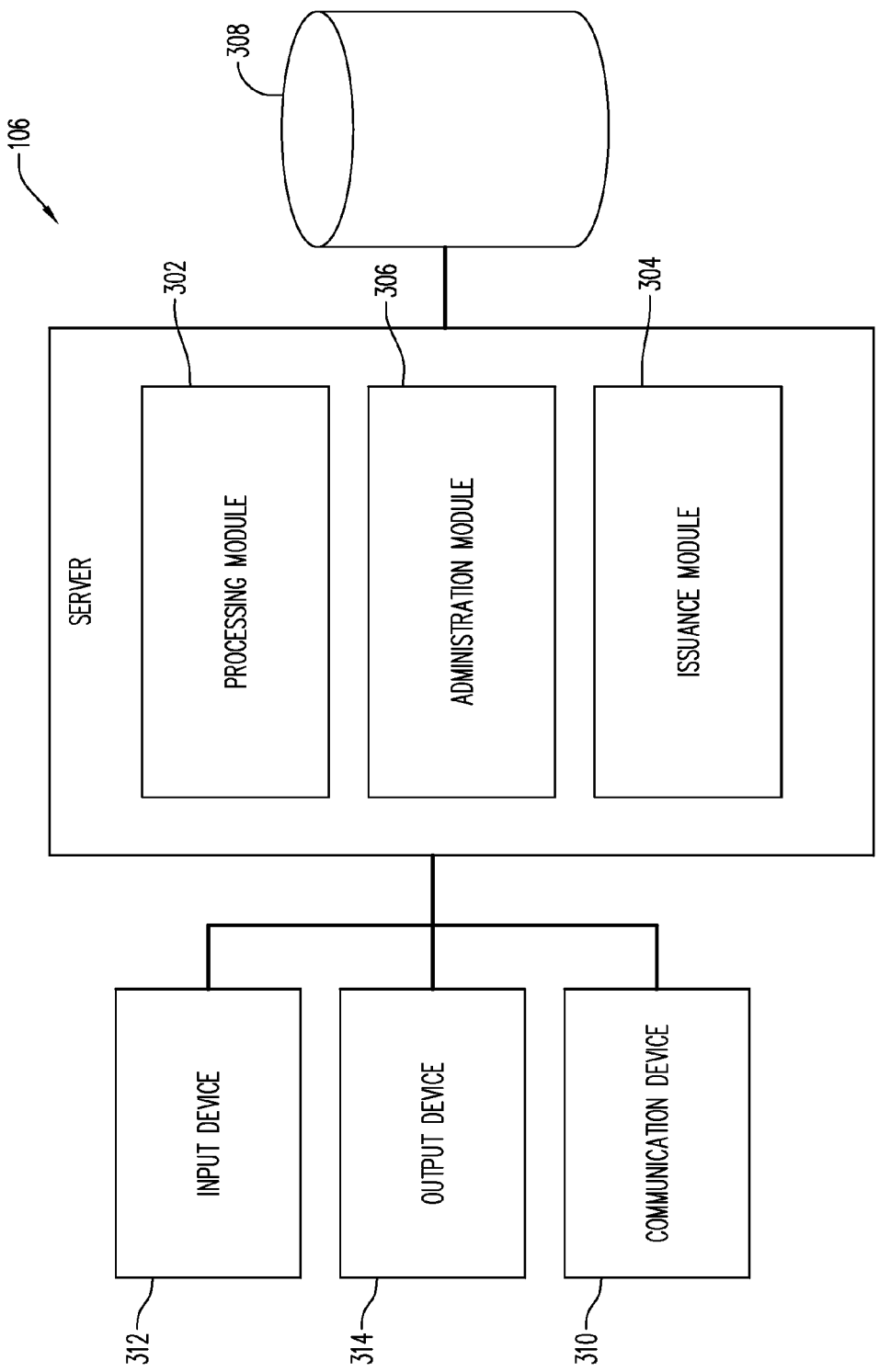
FIG. 3 is a block diagram that illustrates a server computer that is part of the computer system of FIG. 1, and which is operated in accordance with aspects of the present invention.

FIG. 3 is a block diagram representation of the issuance and administration server computer 106. The issuance and administration server computer 106 may be conventional in terms of its hardware aspects.

As depicted in FIG. 3, the issuance and administration server computer 106 includes a processing module 302, which may be constituted by one or more conventional computer processors. The issuance and administration server computer 106 further includes an endorsement issuance module 304, which receives information relative to the risks to be insured, and generates information for indicating the amount of premium payment to be required for the proposed employee absence coverage policy endorsement. In addition, the endorsement issuance module 304 may generate documents and data records required to accomplish issuance of the employee absence coverage policy endorsement. The endorsement issuance module 304 may be constituted, at least in part, by the processing module 302 in combination with suitable software program instructions. Aspects of the software program instructions for the endorsement issuance module 304 will be described below.

The issuance and administration server computer 106 further includes a policy administration module 306 which stores, generates and retrieves information relating to administration of employee absence coverage policy endorsements. For example, the policy administration module 306 may interact with a billing server (not shown) to incorporate billing for the employee absence coverage policy endorsement into bills rendered by the insurance company to the insured, and to receive communications to indicate that premiums for the endorsement and underlying policy have been paid. Further, the policy administration module 306 may receive information relating to claims under the employee absence coverage policy endorsement and may facilitate handling and resolution of such claims by claim handlers employed by the insurance company.

The policy administration module 306 may be constituted, at least in part, by the processing module 302 in combination with suitable software program instructions. The policy administration module 306 may, for example, interact with, or embody, a claim handling software application program that generally operates in accordance with conventional principles. Such a claim handling application may be modified as required to support consideration and resolution of claims under the employee absence coverage policy endorsement.

The issuance and administration server computer 106 further includes one or more storage devices, represented by item 308 in FIG. 3. The storage devices 308 are coupled for data communication with the processing module 302 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 308 may store the above-mentioned software program instructions and/or other program instructions to control the processing module 302 such that the issuance and administration server computer 106 provides desired functionality, as described herein. Thus, the storage devices 308 store one or more programs for controlling the processing module 302. The processing module 302 performs instructions of the programs, and thereby operates in accordance with aspects of the present invention. In some embodiments, the programs may include one or more conventional operating systems. The programs may further include application programs such as a conventional data communication program and a conventional database management program. Aspects of the application programs will be described below.

The issuance and administration server computer 106 may further include one or more communication devices 310 coupled to the processing module 302. The communication devices 310 may function to facilitate communication with, for example, other devices, such as personal computers operated by insureds or prospective insureds and/or operated by underwriting and claim handling employees of the insurance company. In addition, the issuance and administration server computer 106 may include one or more input devices 312 such as a keyboard, a keypad, a mouse or other pointing device, a microphone, knob or switch, an infra-red (IR) port, a docking station and/or touch screen. The input device(s) 312 may be coupled to the processing module 302. Still further, the issuance and administration server computer 106 may include one or more output devices 314, such as a display (e.g., a display screen), a speaker, and/or a printer. The output devices 314 may also be coupled to the processing module 302.

Figure 4:
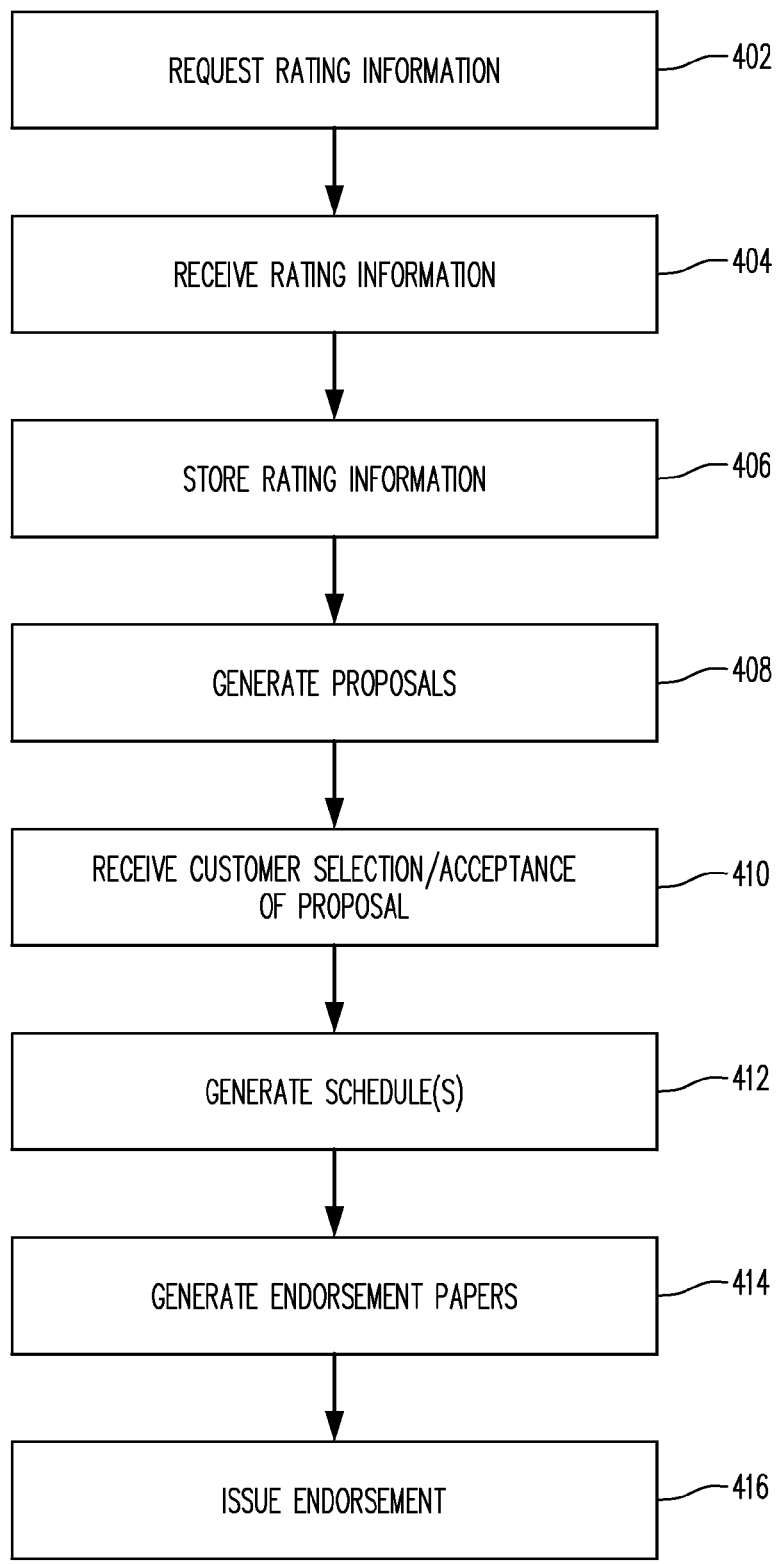
FIG. 4 is a flow chart that illustrates a process performed in the server computer of FIG. 3 according to aspects of the present invention.

FIG. 4 is a flow chart that illustrates a process performed in the issuance and administration server computer 106 according to aspects of the present invention.

At 402 in FIG. 4, the issuance and administration server computer 106 requests that an underwriting employee of the insurance company and/or the prospective insured provide information required to generate a price quotation for a proposed employee absence coverage policy endorsement for the prospective insured. In some embodiments the endorsement in question may relate to a WC policy or to a property/casualty policy such as a fire insurance policy or a commercial real property "all risks" policy. The information needed to rate the proposed coverage may include, for example, a roster of some or all of the employees employed by the prospective insured, with their wage rates and their occupation or occupation category. For example, the employees may be categorized in the same manner as for WC rating. The rating information may also include the location(s) of the prospective insured's facilities and experience rating information for the prospective insured. If lost revenue is to be compensable under the employee absence coverage policy endorsement, the rating information may include, for each employee or category of employees, the maximum daily or weekly dollar amount of lost revenue that is to be compensable.

At 404 in FIG. 4, the issuance and administration server computer 106 receives the requested rating information. In some embodiments, at least some of the rating information may be received from a payroll services contractor for the prospective insured. In this regard, the term "payroll services contractor" refers to a third party contracting company that handles bookkeeping and/or administrative tasks relating to payment of wages to the employees of the prospective insured. (Three well known payroll services contractors are Paychex, Inc., Administaff, Inc. and Automatic Data Processing, Inc.)

At 406, the rating information received at 404 is stored in the storage device 308 (FIG. 3). At 408, the endorsement issuance module 304 processes the stored rating information to determine what is the appropriate premium payment to be quoted for the proposed employee absence coverage policy endorsement.

In some embodiments, the premium to be quoted may be based on such factors as the estimated amount to be paid for each claim, the likelihood that a claim will result, and a suitable factor to account for profit and expense ratio. The estimated amount to be paid for each claim, in turn, may be calculated based on a percentage (e.g., 50%, which may be the coverage limit) of the average weekly wage for each employee to be covered by the proposed employee absence coverage policy endorsement, multiplied by an estimate of how many weeks of absence, on average, will be covered for each claim. The latter estimate may be based on a statistical analysis of employee absence data, such as data regarding compensable absences in connection with WC claims. In some embodiments, the absence data that is analyzed for this purpose may relate to the industry in which the proposed insured operates. In some embodiments, disability data and/or absence data used for rating purposes may be obtained from sources internal to and/or external to the proposed insured employer. For example, payroll information used for rating purposes may be obtained directly or indirectly from data input into the employer's (or payroll service's) computer via a conventional accounting software package such as "QuickBooks". In some embodiments, an experience rating for the proposed insured may also be applied. The estimated absence information may also be based on data relating to disability claims and/or maternity leave absences, and may be based on information available internally to the employer and/or from external sources.

In some embodiments, the premium rating process may be based on stated per employee rates that vary by state and/or by employee class code. For example, in one state the rate for office workers may be $0.20 per $100.00 of payroll; or $10.00 per $100.00 of payroll for construction workers. In some embodiments, for rating purposes each employee on the payroll may be scheduled by occupation.

In some cases, the rating process for a given insured may involve text mining databases such as payroll and/or claims (e.g., WC claims) databases to classify the proposed insured's employees and to determine historical experiences for frequency and/or duration of claims.

For policies that cover additional expense due to employee absence, the prospective additional expense liability of the insurance company for rating purposes may be calculated as a product of (A) coverage factor (i.e., percentage of claimed expenses to be reimbursed); (B) average weekly wage; (C) expected average duration of loss periods; and (D) expected utilization. For policies that cover lost business income due to employee absence, the prospective liability of the insurance company may be calculated for rating purposes as a product of (A) benefit level; (B) average wage; (C) expected average duration of loss periods; and (D) expected utilization. After a period of experience with employee absence coverage, rating may be based on actual average duration and utilization, for example. In addition or alternatively, the rates for this coverage may be stated as an add-on factor to WC coverage rates.

In some embodiments, rates may be tiered by industry (of the insured), based for example on market data.

Premium rates may be calculated in some embodiments by automatically applying rate factors to payroll data for the prospective insured employer.

More generally in relation to setting rates for an employee absence endorsement, elements of loss costs, unallocated expenses and expected profit may all be considered.

Loss costs may consist of the amount that will be paid as a benefit to the insured, as well as any additional expenses directly allocated to claims. For example, when an employee is injured and will miss time from work during his/her recovery, the costs paid by the insurer to the employer constitute loss costs. Additionally, any direct payments made in connection with adjusting the claim would be included in the calculation of loss costs. In establishing an estimate of loss costs, historical claims experience for WC claims may be examined as to average weekly wage and claim duration for all claims over a period of time. Claim duration and average weekly wage may be analyzed by industry, geographically and/or according to other variables. Allocated expenses may include litigation, investigation, and other costs associated with a claim that are not paid directly to the insured.

Unallocated expenses may include costs for underwriting, claims adjusting, and systems support. These costs may be expressed as percentages of the overall premium. Other unallocated expenses may be commissions paid to agents, taxes/licensing/fees (TL&F), other underwriting expense (OUE) and unallocated loss and expense (LAE) for claims handling.

In some embodiments, the endorsement issuance module 304 may generate a respective proposal (premium payment quotation) for each of several levels of possible employee absence coverage. According to a basic level of coverage, the duration of coverage for each absence may be limited to a basic duration, such as 30 days. According to an intermediate level of coverage, the duration of coverage for each absence may be limited to an intermediate duration, such as 60 days. According to a maximum level of coverage, the duration of coverage for each absence may be limited to a maximum duration, such as 90 days. (It will be appreciated that these are only example durations, and may vary in particular embodiments of the invention.) The length of maximum covered duration for each level of coverage may affect the estimated duration of each absence for which claims may be made, and thus may affect the proposed premium payment that is quoted for each level of coverage. In some embodiments, the duration of coverage(s) provided or available may vary according to the industry in which the proposed insured operates.

In some embodiments, there may be differences among the coverage levels in terms of what types of absence are covered. For example, in the basic coverage level, it may be the case that only WC compensable absences are covered. The intermediate level may cover both WC compensable absences, plus absences that are covered for employee benefits under a disability insurance plan. The maximum level may cover any absence except absence due to termination of employment. These varying types of covered absence may affect the estimated likelihood of claims taken into account in calculating the quoted premium for each level of coverage.

In some embodiments, the employee absence endorsement may also provide coverage for expenses incurred by the covered employer in cases where an injured employee remains on the job but is restricted to light duty. For example, recovered expenses in such a case may include overtime costs for another employee or employees to cover for the employee who is on restricted duty.

The coverage levels may also vary in terms of the weekly dollar limit that is applicable to each claim. For example, for the basic level the coverage limit may be 50% of the absent employee's average weekly wage. For the intermediate level, the coverage limit may be 75% of the absent employee's average weekly wage. For the maximum coverage level, the coverage limit may be 100% of the absent employee's average weekly wage. These different coverage limits may lead to differing estimates as to the expected average total payment per claim to be used in calculating the quoted premium payment for each level of coverage.

Where the proposed employee absence coverage policy endorsement includes coverage for lost revenue, the rating information way include a schedule that sets a limit for the weekly or monthly lost revenue that may be claimed for each employee. These limits and the classifications of the employees may be factors used by the endorsement issuance module 304 in estimating the probable amounts and likelihoods of claims under this aspect of the endorsement.

Figure 5:
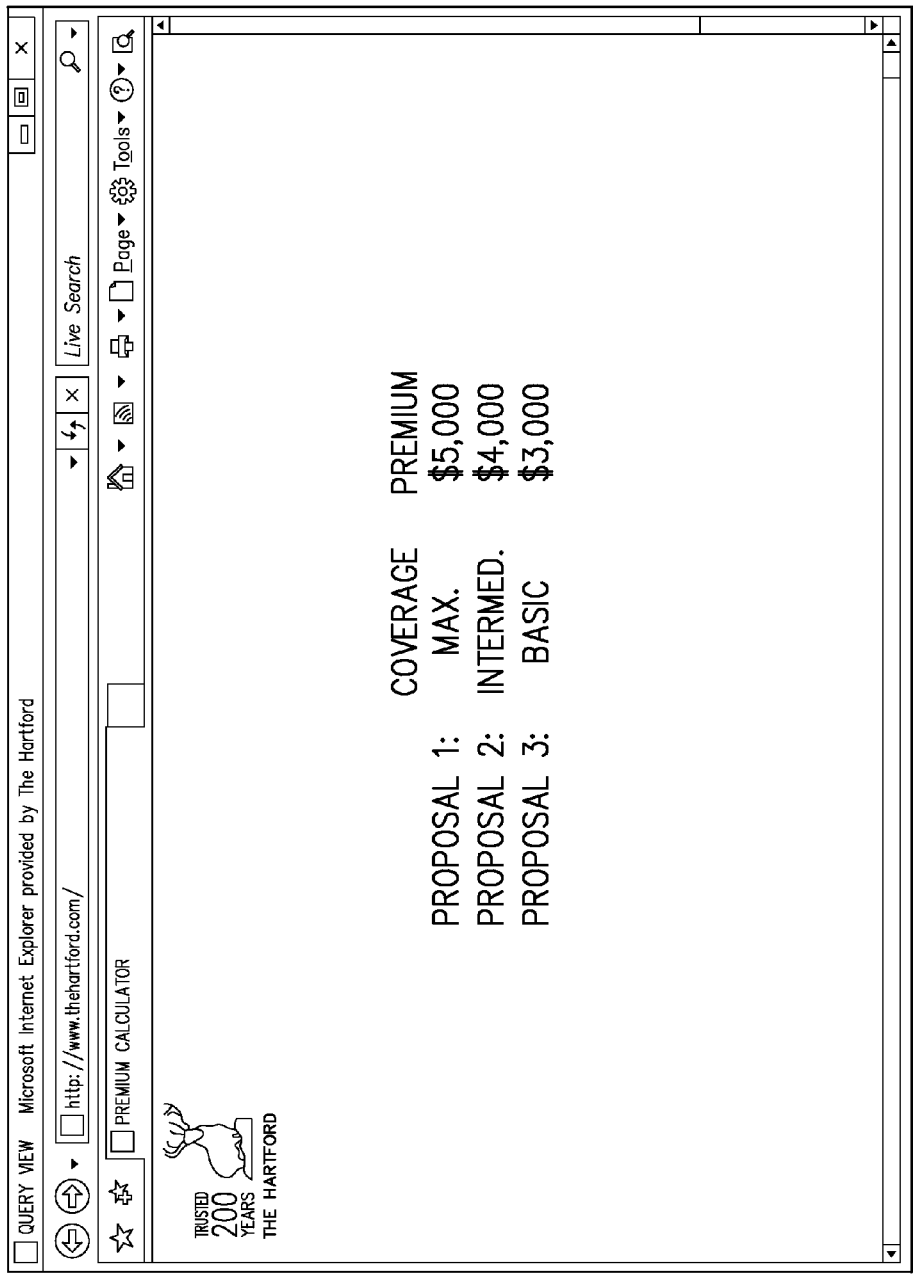
FIG. 5 is a screen display provided to a user of the computer system of FIG. 2 in connection with the process of FIG. 4.

As a result of the calculations described above, the endorsement issuance module 304 may produce one or more proposed premium quotations at step 408 (FIG. 4). The resulting proposed premium quotations may be displayed by the computer system 200 to the underwriting employee (underwriter) of the insurance company and/or to the proposed insured. FIG. 5 shows a simplified example of a suitable screen display for displaying proposed premium quotations to the underwriter/insured. For example, this screen display may be downloaded from the issuance and administration server computer 106 (FIG. 2) to the insurance company underwriter personal computer 108 and/or to the insured's personal computer 202 for display by the display units of the personal computer(s) 108 and/or 202.

Referring again to FIG. 4, at 410 the issuance and administration server computer 106 may receive an indication that the proposed insured has accepted one of the proposed levels of coverage and has agreed to the proposed premium payment. For example, this indication may take the form of a signal sent from the underwriter personal computer 108 or the insured's personal computer 202. In response to this indication, the endorsement issuance module 304 of the issuance and administration server computer 106 may (at 412) generate one or more schedules required to document the proposed employee absence coverage policy endorsement. Also, at 414, the endorsement issuance module 304 may generate suitable insurance policy endorsement documents for the proposed endorsement. At 416, the endorsement issuance module 304 may issue the employee absence coverage policy endorsement. This may involve sending the document(s)/schedules by physical and/or electronic mail to the insured. In addition, the endorsement issuance module 304 may cause suitable data relating to the endorsement to be stored in connection with the policy administration module 306 of the issuance and administration server computer 106. Issuance of the employee absence coverage policy endorsement may also involve billing of the premium to the insured. In some embodiments, the billing for the endorsement may take place automatically through a payroll services company retained by the insured employer.

In some embodiments, payroll information upon which the premium is calculated may be subject to audit (e.g. in similar fashion to auditing for WC coverage premiums)>The premium may be subject to change as the insured's payroll and/or roster of covered employees changes. A premium audit with respect to the endorsement may also be triggered by or based on information received by the insurer in adjusting or handling one or more claims under the endorsement.

More specifically, submission of a claim may trigger a premium audit workflow process. The workflow process may provide for examination of the records of a policyholder employer to determine the accuracy of the estimated policy premium in force in view of the submitted claim.

The premium audit may indicate if any additional premium is owed to the insurer or any credits are to be received by the insured based on payroll adjustments by the audit process which may uncover over-reporting, under-reporting or mis-reporting of workers and corresponding classifications.

In some embodiments, the employee absence coverage policy endorsement may be issued as an endorsement to an existing WC policy in force from the insurance company for the insured entity. Alternatively, the employee absence coverage policy endorsement may be an endorsement to a property/casualty policy or to another type of policy. Moreover, the endorsement may be issued in connection with issuance of a new WC, property/casualty, group life, group benefits, or other type of insurance policy.

The resulting policy endorsement may provide insurance coverage that reimburses the insured employer for costs related to hiring a replacement worker for a limited period of time during the absence from work of an individual employed by the insured. In addition or alternatively, the endorsement may provide reimbursement to the employer for overtime compensation paid by the employer to other regular employees to cover duties assigned to the absent employee. The endorsement may also cover other types of expenses arising from employee absence, such as travel and/or living expenses reimbursed by the employer to a replacement employee or employees. In addition or alternatively, the endorsement may reimburse the employer for revenue lost due to an employee's absence.

In some embodiments, there may be a waiting period, such as one week away from the job, before an employee's absence gives rise to a claim under the endorsement.

In some embodiments, the amount reimbursable to the insured employer may be subject to a per employee, per period cap. The cap may be scheduled in the endorsement by employee and/or by category of employee.

In some embodiments, the duration of the absence for which coverage applies may be subject to a time limit. The time limit may vary by class of employee. For example, for employees who hold physically demanding jobs, the time limit may be longer than it is for office workers.

It may be a requirement under the endorsement that the employer demonstrate its actual replacement/overtime costs or lost revenues due to the absence of the employee. In some embodiments, the coverage reimburses less than 100% (for example, 75%) of the demonstrated cost/lost revenue.

In some embodiments, a deductible and/or coinsurance may apply. In some embodiments, benefits under the employee absence endorsement may be paid weekly or on some other periodic basis or on a one-time basis (e.g., at the end of the covered absence).

Figure 6:
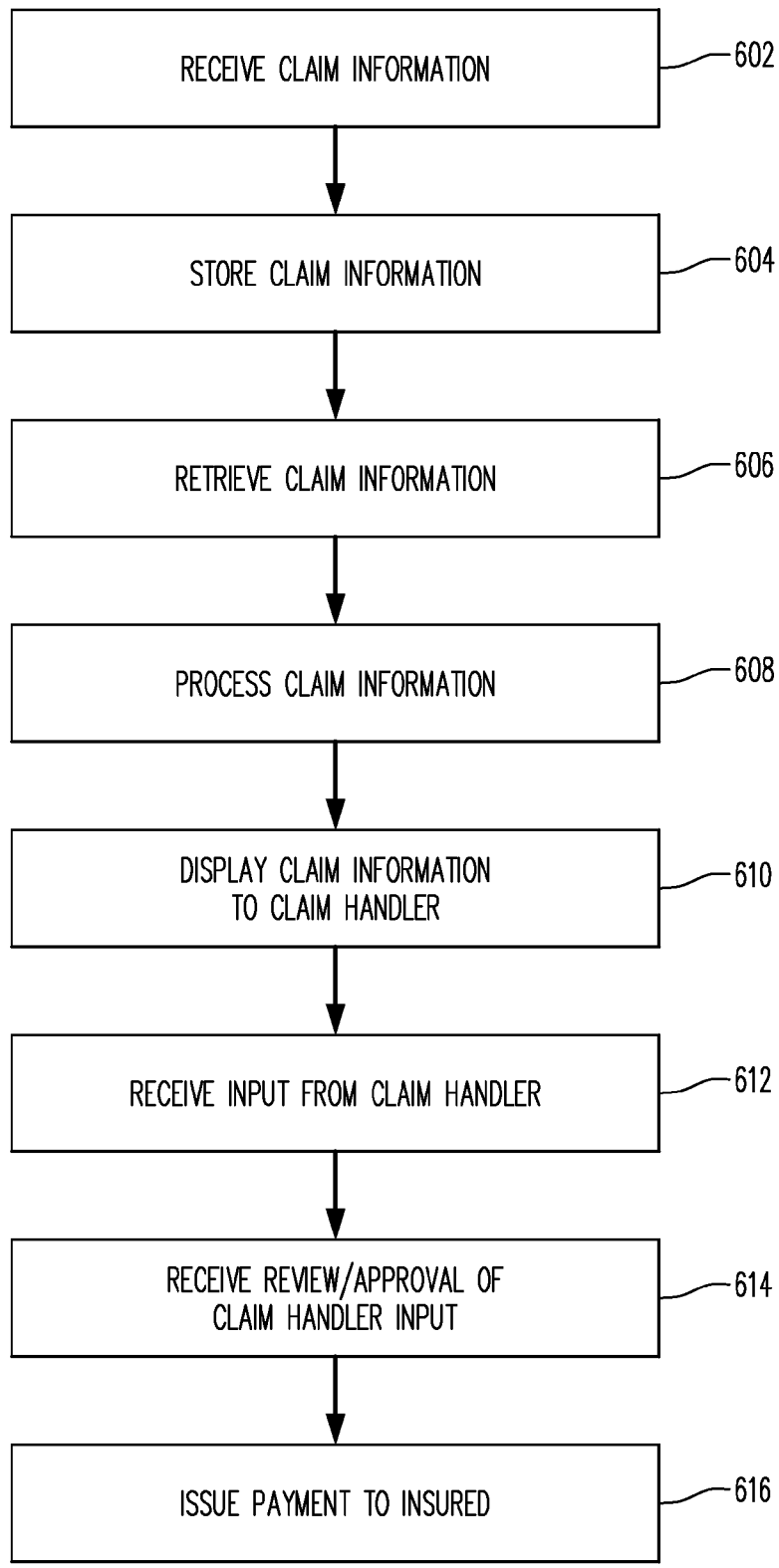
FIG. 6 is a flow chart that illustrates another process performed in the server computer of FIG. 3 according to aspects of the present invention.

FIG. 6 is a flow chart that illustrates a process performed in the issuance and administration server computer 106 according to aspects of the present invention with respect to a typical claim under an employee absence coverage policy endorsement.

At 602 in FIG. 6, the issuance and administration server computer 106 (i.e., the policy administration module 306) receives information related to a claim under the employee absence coverage policy endorsement. For example, the claim information may be received from a claim handler employee of the insurance company (e.g., via the personal computer 108) or by an administrative/data entry employee of the insurance company, or directly from the insured (e.g., via the insured's personal computer 202).

The claim information may include, for example, the name and other identifying information for the employee who has been absent from work, the cause of the absence, and details concerning the costs incurred by the employer and/or revenues lost by the employer due to the absence.

At 604, the policy administration module 306 may store the claim information in the storage device 308 of the issuance and administration server computer 106. At 606, the policy administration module 306 retrieves the claim information from the storage device 308 for further processing.

At 608 the policy administration module 306 processes the retrieved claim information. For example, the policy administration module 306 may apply coverage rules such as any applicable caps, limits on the duration of covered absences and/or factors that reflect the proportion of loss that is reimbursable under the employee absence coverage policy endorsement. These coverage rules can be selectively applied depending upon the characteristics of the policy endorsement which are stored in a database in the data processing system. The outcome of the processing may be an amount that is reimbursable to the insured for the claim. Data reflecting the results of the processing at 608 may be stored in the storage device 308 and downloaded by the policy administration module 306 to the insurance company computer 108 operated by the claim handler assigned to the claim.

Figure 7:
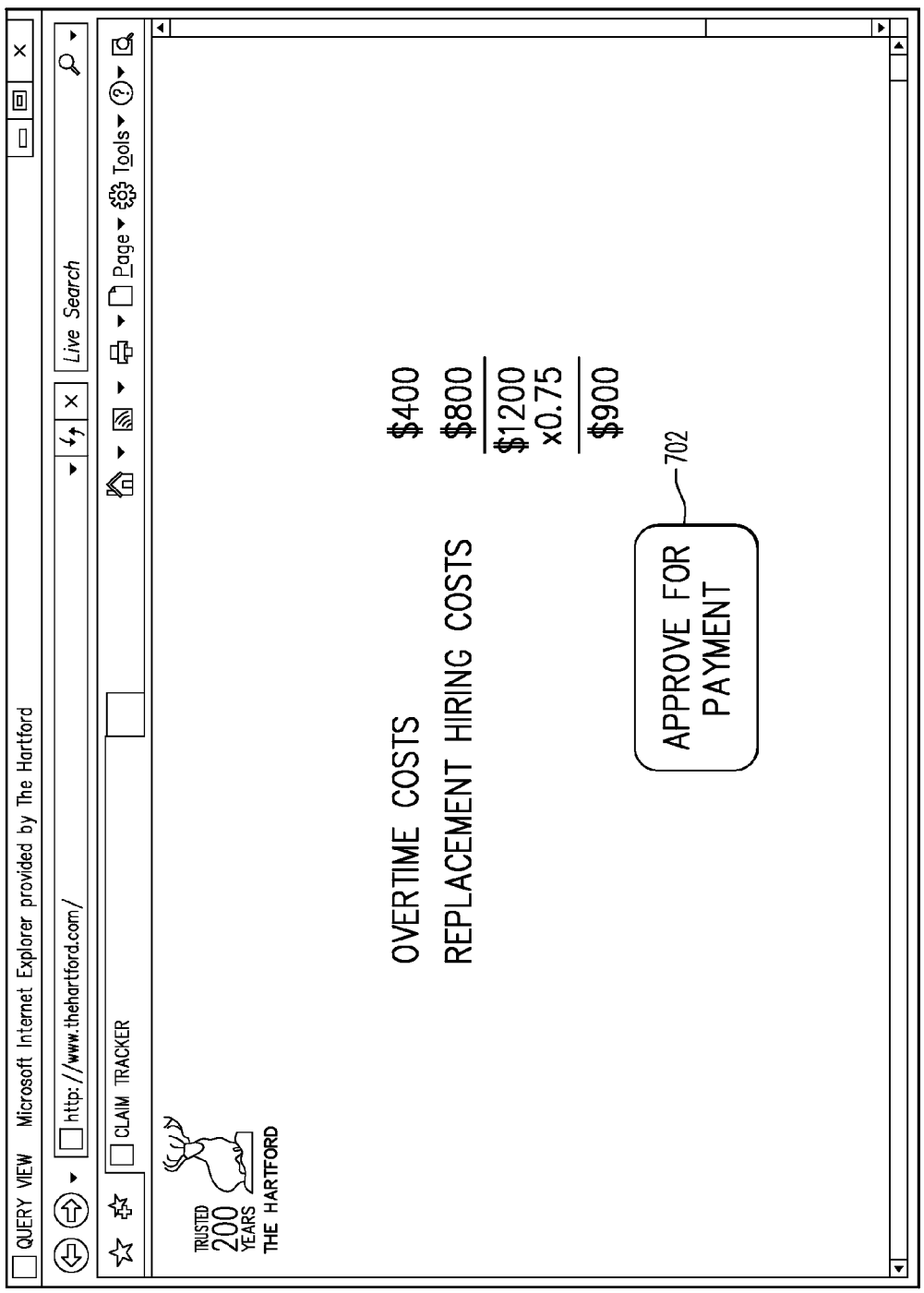
FIG. 7 is a screen display provided to a user of the computer system of FIG. 2 in connection with the process of FIG. 6.

At 610, the claim handler's computer 108 displays to the claim handler the data downloaded from the policy administration module 306 of the issuance and administration server computer 106 regarding the claim. FIG. 7 is a simplified example screen display that may be displayed at step 610 by a display component of the claim handler's computer 108. The claim handler may take various steps to review the information provided by the policy administration module 306 and/or stored in the storage device 308 relating to the claim. For example, the claim handler may "drill down" to review details of the claim information. He/she may, for example, interview an administrative employee at the claimant/insured company to verify some or all of the claim information. He/she may compare the claim with other claims previously received from the claimant. He/she may also obtain relevant information from third parties.

Figure 8:
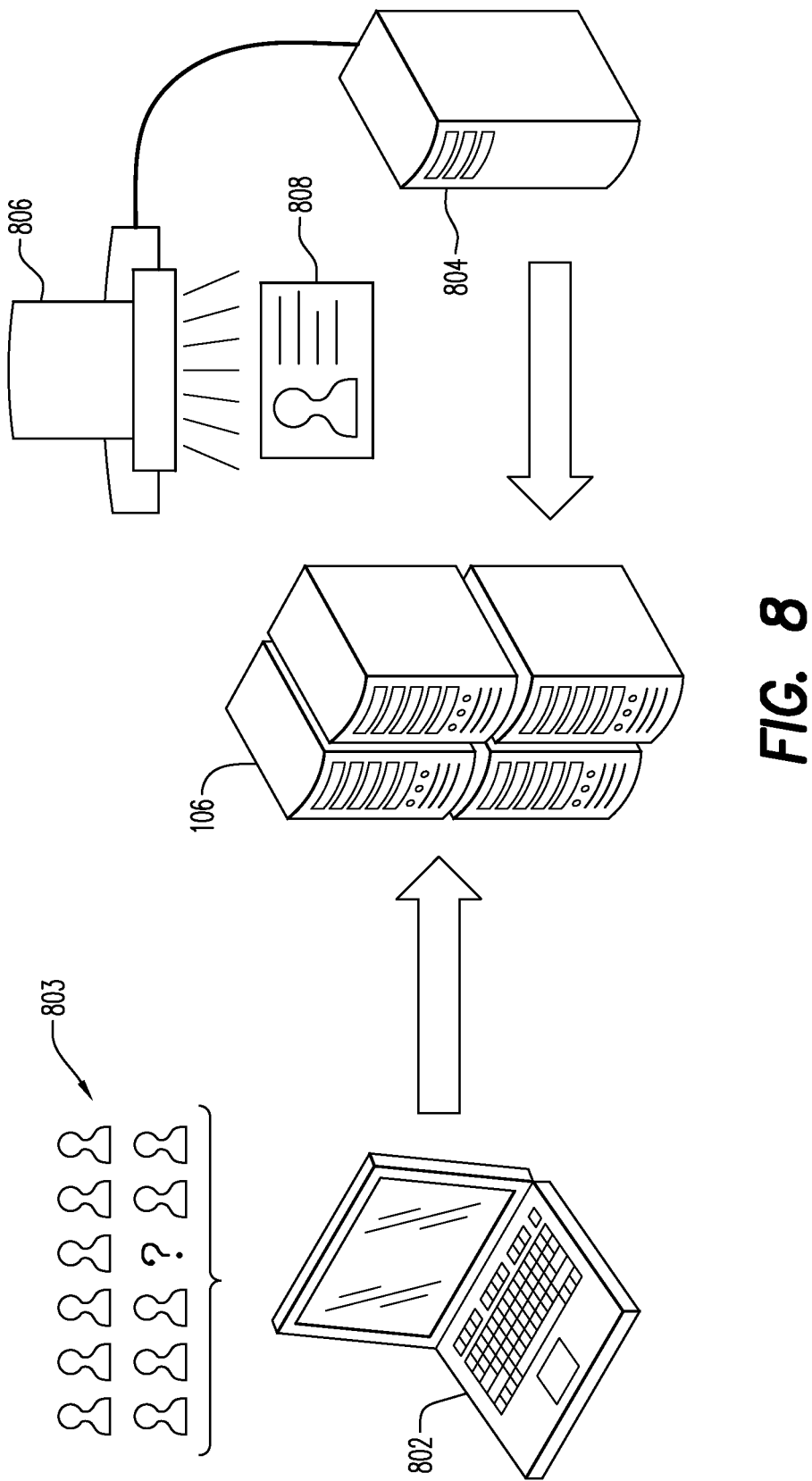
FIG. 8 is a block diagram that illustrates other aspects of the present invention.

For example, as illustrated in FIG. 8, one or more payroll services contractors 802 may provide information to the issuance and administration server computer 106 of the insurance company to indicate for a given insured whether or not particular employees of the insured have been compensated for a given pay period, and if so, how much. (In the drawing, the payroll services contractors 802 are represented by a typical laptop computer, which may be operated by such a contractor and which may store and transmit payroll-related information, schematically indicated at 803.) The claim handler may, for example, use this information to verify that the claimed absence has indeed occurred, at least as reflected in payroll records for the insured. The claim handler may also use this information to verify payment of overtime compensation to other employees.

Further, FIG. 8 shows "badge readers" 804 as another source of information that may be uploaded to the issuance and administration server computer 106. By "badge readers", this disclosure refers to devices installed and used at employer locations to read employee identification badges issued to employees. The reading technology involved may be, for example, RFID or magnetic stripe reading. For example, a typical badge reader may include a reading/scanning element 806 that reads an employee badge 808. The badge readers 804 may function to grant access to the company facilities and/or to sign in employees and/or to sign out employees at the employer's premises. Information uploaded from the badge readers 804 to the issuance and administration server computer 106 may indicate dates and/or times when individual employees logged in or out of their employers' premises. The claim handler may refer to information uploaded to the issuance and administration server computer 106 from the insured's badge reader(s) to verify that the employee claimed to be absent was not logging in at the employer's premises during the claimed period of absence. In addition, or alternatively, the claim handler may use information uploaded to the issuance and administration server computer 106 from the insured's badge reader to confirm the claimed overtime work by other employees.

Referring again to FIG. 6, at 612 the policy administration module 306 of the issuance and administration server computer 106 may receive input from the claim handler to indicate that the claim handler authorizes payment of the claim as proposed by the results of the processing of the claim by the policy administration module 306. For example, the claim handler may provide this input by actuating ("clicking on") the "Approve" button 702 shown in the screen display illustrated in FIG. 7. At 614, the policy administration module 306 may receive input indicating that a supervisory employee in the claims department has reviewed and approved the claim handler's decision to pay the claim. Then, at 616, the policy administration module 306 may issue payment for the claim to the insured employer.

The input from the payroll services contractors 802 and/or the badge readers 804 was described above as being used in the claim handling process. In addition, or alternatively, this information may be used in a post-audit of claim handling and payment activities. For either or both purposes, information from the payroll services contractor or from the employer may be used to verify baseline payroll information for the employees, to verify the average weekly wages for the employees, and/or to verify that a light duty assignment is actually occurring (e.g., by verifying that the wages paid to the employee have been decreased).

Insurance coverage for employer costs/losses due to employee absence has been described above as being issued as an endorsement to a WC policy, a property/casualty insurance policy, or another type of policy. Alternatively, however, such coverage may be provided in a stand-alone insurance policy.

Processes portrayed herein as being performed by one computer may in practice be divided among two or more computers. Processes portrayed herein as being performed by two or more computers may in practice be performed by a single computer.

The process descriptions and flow charts contained herein should not be considered to imply a fixed order for performing process steps. Rather, process steps may be performed in any order that is practicable.

As used herein and in the appended claims, "employee absence" (or "absence from work by an employee") should be understood to include assignment of an employee to restricted duty due to injury or illness.

As used herein and in the appended claims, the term "hiring a replacement worker" refers both to directly hiring a worker and to hiring a worker via a temporary employment agency or the like.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A data processing system for administering an insurance contract, said system comprising:
A processor;
a memory which stores instructions executable by the processor for:
receiving claim information relating to a claim under said insurance contract, said contract for the benefit of a holder of said contract, said holder being an employer, said claim information indicative of a claim made by said holder under said insurance contract for at least a portion of costs incurred by said holder as a result of absence from work by an employee of said holder;
storing said received claim information and coverage rules information related to said insurance contract, said coverage rules comprising a duration limit for covered absences, the duration limit varying by class of employee;
retrieving said claim information, including class of the employee and a duration of the absence from work of the employee, determining a duration limit based on the received class of the employee, and applying said coverage rules information to said claim information, including applying said determined duration limit to said received duration of the employee, to determine an amount that is reimbursable to the holder for said claim; and
responsive to determining, based on the applying of said coverage rules information to said claim information, the amount that is reimbursable to the holder for said claim, authorizing payment for said claim to said holder; and a display for displaying said processed claim information.

2. The data processing system of claim 1, wherein the insurance contract is selected from the group consisting of: (a) a group life insurance policy, (b) a group benefits policy, (c) an employer-provided health insurance policy, (d) a worker's compensation insurance policy, (e) a property insurance policy, and (f) a casualty insurance policy.

3. The data processing system of claim 2, wherein the insurance contract is a workers' compensation insurance policy and said claim is made pursuant to an endorsement to said workers' compensation insurance policy.

4. The data processing system of claim 3, wherein one of said coverage rules includes absence from work is compensable to said employee under said workers' compensation insurance policy.

5. The data processing system of claim 3, wherein said absence from work is not compensable to said employee under said workers' compensation insurance policy.

6. The data processing system of claim 2, wherein the insurance contract is a stand alone policy.

7. The data processing system of claim 1, wherein said coverage rules comprises at least one of an applicable cap on payment, and type of loss and percentage of loss covered.

8. The data processing system of claim 1, wherein the insurance contract is at least one of a property insurance policy and a casualty insurance policy and said claim is made pursuant to an endorsement to said at least one property insurance policy and casualty insurance policy.

9. The data processing system of claim 1, wherein said costs incurred relate at least in part to hiring a replacement worker to perform tasks assigned to said employee.

10. The data processing system of claim 1, wherein said costs incurred relate to at least one of travel expenses and living expenses for a replacement employee.

11. The data processing system of claim 1, wherein said costs incurred relate at least in part to paying overtime compensation to other employees to perform tasks assigned to said absent employee.

12. The data processing system of claim 1, wherein said memory stores instructions executable by the processor for receiving payroll-related information from a payroll services contractor for said holder.

13. The data processing system of claim 1, wherein said claim relates at least in part to revenue lost by said holder due to said absence of said employee.

14. The data processing system of claim 13, wherein said memory stores instructions executable by the processor for validating data relating to said lost revenue.

15. The data processing system of claim 14, wherein said lost revenue is validated by reference to at least one of a database and data supplied by a third party information supplier.

16. The data processing system of claim 1, wherein said memory stores instructions executable by the processor for receiving information from a badge reading device operated by said holder, the information from the badge reading device comprising dates and times of employees logging in or out of the holder's premises, and for making the information comprising dates and times of employees logging in or out of the holder's premises available to a claim handler for verification of employee absence.

17. A method for administering an insurance contract, said method comprising:
  receiving, in a computer, claim information relating to a claim under said insurance contract, said contract for the benefit of a holder of said contract, said holder being an employer, said claim information indicative of a claim made by said holder under said insurance contract for costs incurred by said holder as a result of absence from work by an employee of said holder;
  storing said received claim information and coverage rules information related to said contract in the computer, said coverage rules comprising a duration limit for covered absences, the duration limit varying by class of employee;
  retrieving said claim information, including employee class, and a duration of the absence from work of the employee, determining a duration limit based on the received class of the employee, and applying said coverage rules information to said claim information in said computer, including applying said determined duration limit to said received duration of the employee, to determine the amount that is reimbursable to the holder for said claim;
  displaying said claim information to a claim handler by a display coupled to said computer; and
  authorizing payment, by said computer, for said claim to said holder in response to input provided to said computer by said claim handler.

18. The method of claim 17, wherein the insurance contract is selected from the group consisting of: (a) a group life insurance policy, (b) a group benefits policy, (c) an employer-provided health insurance policy, (d) a worker's compensation insurance policy, (e) a property insurance policy, and (f) a casualty insurance policy.

19. The method of claim 18, wherein the insurance contract is a workers' compensation insurance policy and said claim is made pursuant to an endorsement to said workers' compensation insurance policy.

20. The method of claim 18, wherein the insurance contract is at least one of a property insurance policy and casualty insurance policy and said claim is made pursuant to an endorsement to said at least one property insurance policy and casualty insurance policy.

21. The method of claim 17, further comprising:
  responding to the receiving of said claim information by initiating an audit of a premium base for the insurance contract.

22. The data processing system of claim 17, wherein said coverage rules comprises at least one of an applicable cap on payment, and type of loss and percentage of loss covered.

* * * * *